Figure 1:
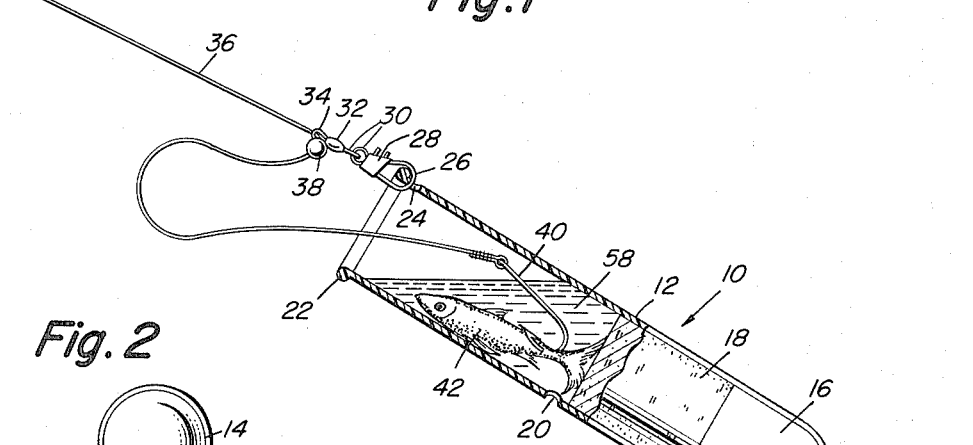

Sept. 28, 1965  R. B. HOLTHAUS  3,208,182
BAIT CASTING AND FISHING BOBBER
Filed April 1, 1964
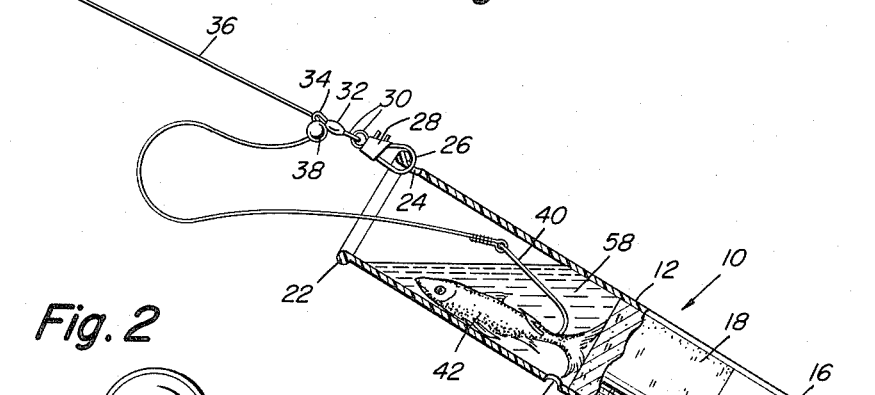
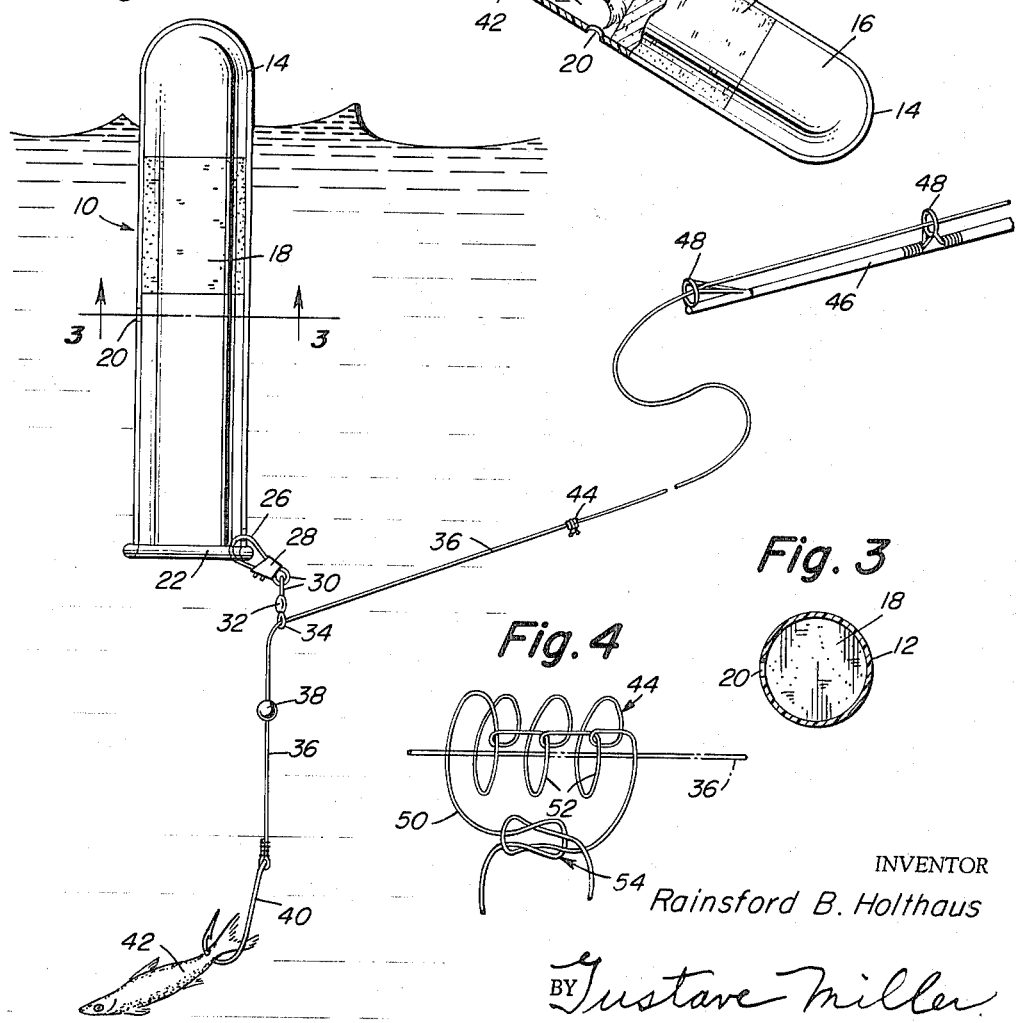
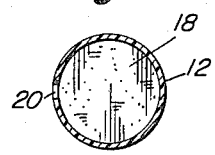
INVENTOR
Rainsford B. Holthaus
BY Gustave Miller
ATTORNEY Sept. 28, 1965  R. B. HOLTHAUS  3,208,182
BAIT CASTING AND FISHING BOBBER
Filed April 1, 1964

INVENTOR
Rainsford B. Holthaus

BY Gustave Miller
ATTORNEY

United States Patent Office 3,208,282
Patented Sept. 28, 1965

3,208,282
TEMPERATURE MEASURING
Florent H. Bailly, Arcadia, Calif., assignor to Variperm Company, Los Angeles, Calif., a corporation of California
Filed Nov. 1, 1962, Ser. No. 234,764
3 Claims. (Cl. 73—339)

This invention relates to methods for measuring temperature with minerals which undergo thermal reactions on heating.

It is well known that various types of minerals react to give up or absorb heat when they are heated. The appearance, sequence and magnitude of characteristic thermally-induced endothermic or exothermic reactions have, in the past, provided a basis for identification of thermally active mineral constituents in a sample. The reactions in various samples occur over a wide temperature range. For example, Epsomite reacts at the relatively low temperature of 45° C., pyrolusite reacts at 1000° C. (1832° F.), and many other minerals react at intermediate temperatures.

This invention uses thermally reactive mineral samples as sensors to measure temperature, and is particularly useful in measuring relatively high temperatures which are measured only with great difficulty, or not at all, by prior art techniques. For example, with prior art surface recording equipment, the maximum recordable temperature in oil wells has been about 350° F., but this invention provides for measuring temperatures five times that value.

Although the invention may be used for measure temperature over a wide range, and in many different environments, it is particularly well suited for measuring the high temperatures found in wells used to produce in situ combustion to facilitate oil recovery from underground formations. Conventional temperature measuring systems have not been satisfactory because of inadequate or prohibitively expensive insulation required for previously available instrumentation. This invention provides a system for measuring temperatures which does not require elaborate or expensive insulation.

In terms of method, the temperature of a first environment is measured with a mineral sample, which undergoes a thermal reaction on heating, by disposing the sample in the first environment for a sufficient length of time to permit the temperature of the sample to approach that of the first environment. Thereafter, the sample is removed from the first environment, placed in a second environment and heated to a temperature required to produce the thermal reaction in the sample. If the sample reacts, it indicates that the temperature of the first environment was below that required for the reaction. If no reaction occurs in the second environment at the temperature which would ordinarily cause such a reaction, it is evident that the temperature in the first environment exceeded the temperature required to produce the thermal reaction in the sample.

If only a rough estimate is required of down-hole temperature, then it is satisfactory to use only one sample which reacts at only one temperature. However, it is generally desirable to know within a relatively narrow range the temperature of the first environment. In such a case, a plurality of samples may be used which react at different temperatures, or a single sample may be used which undergoes a plurality of thermal reactions at different temperatures. By selecting a sample or samples which undergo a plurality of thermal reactions, one of them being at a temperature above that of the first environment, it is relatively simple to determine within a fairly narrow range the temperature of the first environment.

The thermal reactions of the sample or samples may be endothermic or exothermic. Occasionally, an exothermic reaction may give off so much heat as to cause spurious triggering of another thermal reaction. This is easily avoided by using a sample or samples which undergo endothermic reactions, when necessary.

In terms of apparatus, the invention includes a body with at least one recess in it for holding a mineral sample. A top is provided to fit on the body and cover the recess. A thermocouple junction is secured to the cover and disposed so that it extends into the recess when the cover is fitted on the body.

When a plurality of samples are used, the body includes a plurality of recesses, and a plurality of thermocouple junctions are secured to the cover and disposed so that a separate junction extends into each recess when the top is fitted on the body.

In the presently preferred embodiment, the apparatus includes a sealed container for the body and means are provided for lowering and raising the container on a wire line to facilitate use of the apparatus in well bores. Preferably, the container includes means for automatically maintaining a substantially constant pressure within the container to simulate the pressure of the second environment, which often is atmospheric. Preferably, the body for holding a sample, or samples, is a thermally inert porous refractory material which can be specifically designed to have various heat transmission properties to meet different requirements of many environments.

Figure 2:
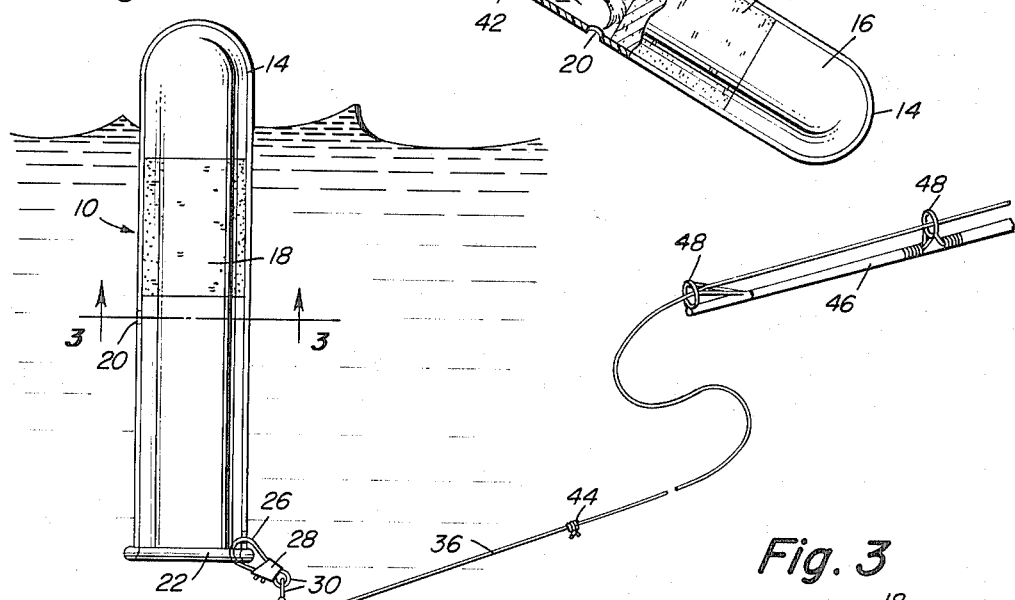
Figure 3:
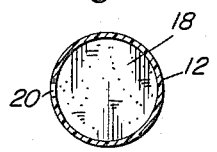
Figure 4:
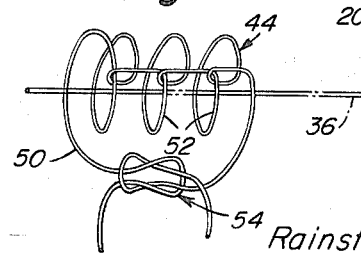

These and other aspects of the invention will be more fully understood from the following detailed description and the accompanying drawings, in which:

FIG. 1 is a sectional elevation of the presently preferred embodiment of the invention in a first environment, such as a well bore; and FIG. 2 is a schematic drawing showing a circuit arrangement for checking samples after exposure to the first environment.

Referring to FIG. 1, a container 10 is raised and lowered in a well bore 11 by a wire line 12 attached to a pad eye 13 on a cover 14 secured by bolts 15 to the bottom 16 of a container. A gasket 17 between the cover and bottom make a pressure-tight seal. A pressure regulator 18 is set to maintain a desired pressure, say atmospheric, within the container as it is heated due to being lowered in the well bore.

A body 20 of thermally inert material, say porous concrete of the type disclosed and claimed in U.S. Patent No. Re. 24,570 is located in the container bottom 16. The porosity and permeability of such concrete can be tailored to provide thermal conductivity of any desired value.

The top surface of the body includes a plurality of upwardly opening cylindrical recesses 22. A separate cylindrical sample cup 24 makes a snug fit in each recess. The sample cups may be of any suitable material, but preferably are of metal, such as Inconel. For the purpose of explaining the invention, it is assumed that the body includes four recesses, and only two are shown in FIG. 1. Of course, any desired number of recesses may be in the body. A separate powdered mineral sample 25 is disposed within each cup, and the samples are selected to undergo thermal reactions in the temperature range of interest. For example, if it is known that the temperature of the well in the zone under investigation is in the range of 340° C. to 750° C., the sample cups may contain various amounts of hydromagnesite

[3MgCO$_3$.Mg(OH)$_2$.3H$_2$O]

mixed with inert material. 25% hydromagnesite mixed with 75% by weight of a thermally inert material, such as aluminum oxide, undergoes thermal reactions at 340° C., 435° C., 507° C., 575° C., and 745° C.

Other examples of minerals which may be used as sensors are as follows:

|  | Range of thermal reactions degrees C. |
| --- | --- |
| Epsomite | 45 to 370 |
| Gypsum | 175 to 250 |
| Gothite | 100 to 335 |
| Gibbsite | 320 to 340 |
| Brucite | 445 to 455 |
| Siderite | 525 to 650 |
| Pyrolusite | 640 to 1000 |
| Magnesite | 615 to 685 |
| Dolomite | 770 to 925 |
| Calcite | 835 to 935 |
| Mixtures: | |
| Calcite, Dolomite, Magnesite | 640 to 930 |
| Kaolinite, Montmorillonite, Dolomite | 165 to 955 |

Pyrite mixed from .5% up to 10% by weight with siderite and other minerals to control exothermic peak temperatures.

The dolomite, calcite and magnesite samples all undergo endothermic reactions which can be used when necessary to avoid spurious triggering which might otherwise result from exothermic peak temperatures.

A top 26, which is of the same material as the body, makes a close fit on the body and includes a central boss 27 which extends down into a bore 28 in the center of the body. A separate thermo-couple 30 is disposed in the sample in each cup. Each thermo-couple includes a lead wire 31 of one metal, say Chromel, joined to another lead wire 32 of a different metal, say Alumel. The leads are imbedded in and extend upwardly through the top 26.

Referring to FIG. 2, which shows the body 20 in schematic form, it will be seen that the periphery of the body is scalloped to give more uniform heat transfer to the samples. The side wall of the container bottom may be of matching shape to insure uniform contact between the wall and the body around its periphery.

In using the apparatus shown in FIG. 1, the sample cups are filled with a mineral or minerals which undergo thermal reactions in the temperature range of interest. The top is placed on the body so that a separate thermo-couple is imbedded in each sample. The container cover is clamped in the position shown in FIG. 1, and the entire assembly is lowered on the wire line into the well adjacent the underground formation where the temperature is to be determined. The container is left in the well for a sufficient time to permit the samples to approach the temperature of the adjacent formation. The container can be left until the samples are at the same temperature as the formation, or they can be withdrawn prior to that time providing that the heat transfer properties of the system are known so that a reasonably accurate estimate can be made of the temperature of the formation. The entire assembly, except the mineral sensors are inert to any temperature which may be encountered, and there is no need for electrical insulation on the wire line.

After the container has been down-hole for the required time, it is raised by the wire line and the cover is removed. The thermocouple leads are connected in a circuit as shown in FIG. 2, with respective standard thermocouples 32 disposed in standard sample cups 34 in a standard body 36 which is identical with body 20. The standard sample cups 34 may contain an inert material such as aluminum oxide, or each sample in each standard cup may be identical with the sample in the corresponding cup 30 to which it is connected through a pair of thermocouples, except that each standard sample will not have been subjected to an elevated temperature that would cause it to undergo thermal reaction.

The two bodies in FIG. 2 are uniformly heated in a conventional differential thermal analysis furnace (not shown) and the outputs from each of the thermocouples are observed in a conventional manner, say by a recorder (not shown), to determine which of the samples in the down-hole apparatus have undergone thermal reaction. If the standard samples are inert, then the samples in the body that was down-hole are gradually heated and an observation is made of the first sample to undergo thermal reaction. This provides an indication of the maximum temperature to which the down-hole body was subjected during the test. For example, if the four samples shown in FIG. 2 were of the type which underwent reactions at 600°, 625°, 650°, and 675° F., respectively, and the first two samples did not undergo thermal reaction when heated at the surface, but the third sample did react at 650° F., then it is known that the temperature of the body down-hole was between 625° and 650° F. If a more accurate measurement is required, more test samples are used to bracket the temperature as close as necessary.

A similar result is obtained when the samples in the standard body are identical with those in the test body. The only difference is that a thermal reaction is observed at the output of the thermocouples each time a standard sample is heated to a reaction temperature that was exceeded down-hole. When a temperature is reached that causes two samples to react simultaneously, there is no output of the respective thermocouple, and this is a measure of the maximum temperature experienced by the body down-hole.

Thus, by using mineral samples as sensors, temperatures can be measured in remote environments where there may be high prevailing temperatures. Moreover, the measurements can be made quickly and with inexpensive thermally inert equipment.

I claim:

1. A method for measuring the temperature of a first environment with a mineral sample which undergoes a thermal reaction on heating, the method comprising disposing the sample in the first environment for a sufficient length of time to permit the temperature of the sample to approach that of the first environment, maintaining a substantially constant pressure on the sample while it is in the first environment, removing the sample from the first environment and placing it in a second environment, heating the sample in the second environment to a temperature sufficient to cause a thermal reaction in the sample, and sensing the occurrence of any thermal reaction in the sample.

2. A method for measuring the temperature of a first environment with a mineral sample which undergoes a thermal reaction on heating, the method comprising disposing the sample in the first environment for a sufficient length of time to permit the temperature of the sample to approach that of the first environment, maintaining the sample at substantially atmospheric pressure while in the first environment, removing the sample from the first environment and placing it in a second environment, heating the sample in the second environment to a temperature sufficient to cause a thermal reaction in the sample, and sensing the occurrence of the thermal reaction in the sample.

3. A method for measuring temperature in a well with a plurality of mineral samples, at least one of the samples having the characteristic of undergoing a thermal reaction at a first temperature and below that in the well, and at least one other of samples having the characteristic of undergoing a thermal reaction at second temperature higher than the first, the method comprising disposing the samples in recesses in a porous ceramic body in the well for a sufficient length of time to permit the temperature of the samples to rise to a value between the said first and second temperatures, removing the samples from the well and subjecting them to differential thermal analysis to determine which of them underwent a thermal reaction in the well.

References Cited by the Examiner

UNITED STATES PATENTS

| | | | |
|---|---|---|---|
| 2,797,575 | 7/57 | Sand | 73—15 |
| 2,896,442 | 7/59 | Bailly | 73—154 X |
| 2,934,955 | 5/60 | Monaghan | 73—358 |
| 3,018,663 | 1/62 | Dunlop | 73—359 X |

LOUIS R. PRINCE, *Primary Examiner.*

DAVID SCHONBERG, RICHARD C. QUEISSER, *Examiners.*